United States Patent Office 2,763,651
Patented Sept. 18, 1956

2,763,651

PROCESS FOR MELAMINE PRODUCTION

Robert A. Harman, Rowayton, Conn., assignor to Allied Chemical & Dye Corporation, New York, N. Y., a corporation of New York No Drawing. Application April 24, 1953,
Serial No. 351,040

4 Claims. (Cl. 260—249.7)

This invention relates to production of melamine directly from calcium cyanamide and urea and/or oxygen-containing pyrolytic condensation products of urea such as biuret, cyanuric acid, ammelide and ammeline, and/or the urea isomer, ammonium cyanate.

It has been proposed to produce melamine by heating urea alone or in presence of added ammonia at elevated temperatures and pressures. The highest yields obtained in such operations, even at very high pressures, so far as I am aware do not exceed 50% of input urea nitrogen converted to melamine nitrogen.

It has also been proposed to convert calcium cyanamide directly to melamine by heating calcium cyanamide in about 1:1:1:1 mol ratios with carbon dioxide, water and ammonia at elevated temperatures and pressures. The yields of melamine thus obtained do not exceed 45% of input calcium cyanamide nitrogen converted to melamine nitrogen, so far as I am aware; nor exceed about 30% of total input nitrogen including ammonia nitrogen converted to melamine.

Moreover it has been proposed to convert calcium cyanamide directly to melamine by heating, at elevated temperatures and pressures, calcium cyanamide with at least an equimolar proportion, and preferably a larger proportion, of ammonium carbamate or ammonia and carbon dioxide in quantities stoichiometrically equivalent to said ammonia carbamate and preferably with a further quantity of ammonia also added. When the carbamate: cyanamide mol ratio is about 1.5:1 and ammonia in excess of that provided by such amount of ammonium carbamate is employed in such operations, yields of melamine are reported to exceed 100% based on input calcium cyanamide nitrogen converted to melamine nitrogen; but in view of the large quantities of ammonia used in these operations the reported yields of melamine based on total input nitrogen converted to melamine nitrogen are only about 35-40%.

I have now found a process whereby melamine is obtained directly from urea and calcium cyanamide in high yields based on urea, on cyanamide, and on total input nitrogen. Liquid reaction mixtures which are reasonably easy to handle are formed in my process; and the crude melamine produced by my process is moreover readily purified by operations such as sublimation and/or crystallization from hot aqueous solution.

My process comprises heating at least one compound of the group consisting of urea, ammonium cyanate, and the oxygen-containing pyrolytic condensation products of urea with calcium cyanamide in ratios providing 1:5–5:1 ratio of atom-equivalents of oxygen in the urea and/or ammonium cyanate and/or urea condensation product: atom-equivalents of calcium in the calcium cyanamide, and in contact with carbon dioxide and ammonia, at temperatures reaching at least about 200° C. and pressures reaching at least about 500 pounds per square inch absolute, and recovering reaction products containing melamine.

I believe the overall reaction taking place during my process whereby urea and calcium cyanamide are converted to melamine can be represented as follows:

$$3H_2NCONH_2 + 3CaNCN + 3CO_2 \xrightarrow{NH_3} 2(H_2NCN)_3 + 3CaCO_3$$

Urea — Calcium Cyanamide — Carbon Dioxide — Melamine — Calcium Carbonate

This equation calls for 1:1:1 mol ratios of urea:calcium cyanamide:carbon dioxide, and I have found it is desirable that about these mol ratios between these materials should be used. It is not essential however that all of the carbon dioxide ingredient should be supplied from an external source since for example urea can decompose to form carbon dioxide in the reaction mixture and accordingly part or even all of the necessary carbon dioxide can be formed in the reaction mixture during the course of reaction.

Moderate excesses or deficiencies of urea and/or calcium cyanamide reactants, deviating from the 1:1:1 mol ratio called for by the above equation, can be used in accordance with my process; thus either of these reactants can be introduced in mol ratios from about 1:1 up to about 5:1 with the other reactant. Preferably, however, in order to obtain best yields the mol ratios between input urea and input calcium cyanamide are in the range 1:3–3:1; and the input carbon dioxide plus any carbon dioxide formed in the reaction mixture during reaction amounts to at least about 1 mol per mol of input calcium cyanamide.

The ammonia employed in my process, as indicated in the above equation, functions as a stabilizing atmosphere preserving melamine from further conversion, particularly when temperatures of 400° C. and above are used. For this purpose an ample ammonia partial pressure at 400° C. is about 800 p. s. i. Higher ammonia partial pressures can also be used.

It is not essential to provide ammonia from an outside source since urea, for example, can decompose upon heating to form ammonia in the reaction mixture.

The mol ratio of ammonia needed to maintain a given ammonia partial pressure depends principally upon temperature and upon the loading density of solids and liquids in the reaction zone, i. e. upon the weight of reactants, products and any additional non-gaseous substances present under reaction conditions in a given volume of reaction zone in liquid and/or solid phase. The higher this loading density, the smaller is the gas phase volume in the reaction zone and thus the smaller is the mol ratio of ammonia required to maintain a given ammonia partial pressure at given temperature. If the reaction zone is completely filled with a liquid phase or liquid plus solid phase, then the ammonia required will be only that which saturates the liquid at the reaction temperature and pressure. When pressures reached during the reaction are at least about 1500 p. s. i. absolute, adequate ammonia partial pressures are obtained using in the reaction zone not more than about one mol of ammonia introduced from an external source per mol of carbon dioxide introduced from an external source and formed during the reaction.

Temperatures of 200° C. can be used in my process when relatively long reaction times, such as 8 hours and more, are used, reaction being hastened by use of high pressures such as 4500 p. s. i. absolute and above; but preferably temperatures are at least about 300° C. in order to obtain more rapid melamine formation. Temperatures of at least 350° C. are especially desirable since at and above about 350° C. the reaction mixtures become liquid as melamine product therein fuses. Liquid reaction mixtures are more readily handled than solid mixtures under the high pressure conditions of my reaction.

Temperatures up to about 400°–425° C. can conveniently be used without special means for obtaining short contact times and for minimizing further conversion of melamine. Still higher temperatures can be used employing limited reaction times and elevated ammonia partial pressures such as 2500 p. s. i. and above to minimize further conversion of melamine.

Under all conditions employed in my process reaction pressures should reach at least about 500 p. s. i. absolute during the reaction. Such pressures need not be maintained throughout the heating of the reactants however; the reaction pressures may rise in a closed reaction vessel as the reaction proceeds as a result of decomposition; the pressures on the other hand may fall as a result of carbon dioxide consumption.

Preferably the maximum pressure reached during operations in accordance with my invention is at least about 2500 p. s. i. absolute and can be much higher, e. g. several thousand atmospheres. As above pointed out, the ammonia partial pressures preferably reached during operations at and above about 350° C. in accordance with my invention and maintained as long as melamine is held at temperatures above its melting point, i. e. above about 350° C., are at least about 800 p. s. i. and are higher when reaction temperatures substantially above 425° C. are used, suitably reaching at least about 1500 p. s. i. absolute at relatively high temperatures.

Reference has been made in the foregoing to urea as the compound reacting with calcium cyanamide and carbon dioxide. The oxygen-containing pyrolytic condensation products of urea can be substituted for urea, suitably in amounts providing the same amount of oxygen as contained in the urea being replaced. Ammonium cyanate, a urea isomer which is quantitatively converted into urea by heating, is equivalent to urea in my process and can be substituted for urea if desired.

Suitable reaction times in my process depend upon reaction temperature and pressure. Reaction is continued at least until a substantial proportion of the input reaction mixture has been converted to melamine. This point can be recognized by analyzing for melamine; by the fact that the reaction mixture begins to liquefy at temperatures around 350°–360° C. when melamine has been formed therein in substantial quantities; etc.

In addition to the materials introduced as reactants and any ammonia introduced, and products formed, my reaction mixtures can also contain input corrosion inhibitors, catalysts, other melamine-forming reactants such as guanidine salts, impurities associated with the above, solvent ingredients, etc.

In the examples which follow, the method of operation was to charge the heat resistant glass liner of an autoclave with thoroughly mixed urea, calcium cyanamide (as the crude technical product containing about 20–21% by weight nitrogen and about 43–44% by weight calcium) and ammonium carbamate in 1:1:0.5 mol ratios and to add carbon dioxide in the amount required to bring the mol ratio of carbon dioxide:calcium cyanamide up to 1:1. The autoclave was then closed and heated during about 2 hours to the specified reaction temperature and was maintained at reaction temperature for about 2 hours; then was cooled to about 120°–130° C. with a blast of air and vented to release ammonia and carbon dioxide present.

The liner was then removed and the melamine was separated from the reaction products containing it by grinding the autoclave contents, extracting with cold water, extracting the residue with hot water in moderate excess of that required to dissolve a like quantity of melamine, and cooling the hot water extract thus crystallizing melamine. The melamine thus separated was quite pure, and could be made highly pure by one additional recrystallization from water. Extraction of the hot water insoluble residue with hot sodium carbonate solution removed ammelide and ammeline (which are the mono and the diamide of cyanuric acid) from the residue, thus allowing determination of these additional triazine products.

*Example 1.*—Into an autoclave there were fed as above-outlined, urea, calcium cyanamide, carbon dioxide and ammonia in mol ratios 1:1:1:1 where mols of calcium cyanamide were calculated on the basis of nitrogen analysis. The loading density in terms of grams of urea plus calcium cyanamide (by nitrogen analysis) plus carbon dioxide was about 46 grams per 100 cc. of space in the reaction zone. The autoclave was heated as above-outlined to a reaction temperature of 400° C., which was maintained for 2 hours. The pressure rose to a maximum of 3650 pounds per square inch gauge.

The melamine, separated as above-outlined from the recovered product, amounted to about 65% yield, based on input urea nitrogen plus input calcium cyanamide nitrogen converted to melamine nitrogen. The yield of ammelide and ammeline, based on input urea nitrogen plus calcium cyanamide nitrogen converted to nitrogen in the ammelide-ammeline product, was about 10–15%. Based on total input nitrogen, including input ammonia nitrogen, converted to melamine, the melamine yield was about 52%.

*Example 2.*—A reaction was carried out in the same manner as in Example 1 above except that the input mol ratio of urea:calcium cyanamide:carbon dioxide:ammonia was 2:1:1:1 instead of 1:1:1:1. Under these conditions the melamine yield, on the basis of input urea plus cyanamide nitrogen converted to melamine, was 61% and only very small quantities of materials soluble in hot sodium carbonate solution were obtained, about 1% yield on the basis cited in Example 1. The pressure reached in this example was 4700 p. s. i. gauge.

My process can be carried out batchwise as illustrated in the above examples or by continuous or semi-continuous methods. Those continuous and semi-continuous methods have the advantage of minimizing the need for input ammonia, in which liquid and/or solid materials are added to and withdrawn from the reaction zone while preventing release of gases therefrom.

For example, solid reactants can be fed continuously or intermittently into a reaction zone maintained at about 350°–425° C. wherein a molten reaction mixture is maintained together with enough ammonia to provide the requisite ammonia partial pressure of at least 800 pounds per square inch absolute, and carbon dioxide can be supplied at a rate to replace that which is consumed in formation of calcium carbonate and to maintain desired pressure of carbon dioxide, such as 200 p. s. i. absolute or more. The reaction products can be removed without allowing gases to escape, continuously or when reaction becomes slow as shown, for example, by pressure remaining practically constant. In an alternative method of product recovery, ammonia and carbon dioxide can be continuously supplied to the vapor phase in the reaction zone and gases can be continuously bled therefrom into a cooled zone wherein melamine sublimed into the gas phase is recovered.

Alternatively urea and calcium cyanamide can be mixed together and the urea can be melted; this liquid reaction mixture can then be forced under high pressures of at least about 4500 p. s. i. absolute with or without added ammonia and/or carbon dioxide through tubes heated to relatively high temperatures of at least about 375° C. and with relatively short contact times, not above about 1 hour, and progressively shorter the higher the temperature, whereby reaction can be carried out in presence of carbon dioxide and ammonia derived principally or entirely from the urea and/or calcium cyanamide reactants. Rapid heating under high pressure minimizes formation of solids such as ammelide, ammeline and melam.

Other modifications and combinations of these and other suitable ways of carrying out my process will be evident to those skilled in this art.

I claim:

1. Process for production of melamine which comprises heating as starting material at least one compound of the group consisting of urea, ammonium cyanate, biuret, cyanuric acid, ammelide and ammeline in a reaction zone together with calcium cyanamide, using proportions of urea:calcium cyanamide in the range between about 1:5 and about 5:1 mol ratios of urea:calcium cyanamide introduced into the reaction zone when urea is used as the sole starting compound of said group; and using proportions of said other starting compounds which result in proportions of oxygen being in the same range per mol of calcium cyanamide when any of said other starting compounds is introduced into the reaction zone, as when urea in the above specified proportions is the sole starting compound of said group introduced into the reaction zone; and carrying out said heating with the reaction mixture being in contact with carbon dioxide and ammonia and at temperatures reaching at least about 200° C. and at pressures reaching at least about 500 pounds per square inch absolute; and recovering reaction products containing melamine.

2. Process as defined in claim 1, wherein temperatures reach at least about 350° C.; pressures reach at least about 1500 p. s. i. absolute and ammonia partial pressures reach at least about 800 p. s. i. absolute.

3. Process as defined in claim 2, wherein ammonia introduced from an external source into the reaction zone amounts to not more than about one mol per mol of carbon dioxide introduced from an external source and formed during reaction.

4. Process as defined in claim 2, which comprises heating in a reaction zone urea and calcium cyanamide fed into the reaction zone in input mol ratios between about 1:3 and about 3:1 and wherein the input carbon dioxide plus any carbon dioxide formed in the reaction mixture during reaction amounts to at least about one mol per mol of input calcium cyanamide and pressures reach at least about 2500 p. s. i. absolute.

References Cited in the file of this patent

UNITED STATES PATENTS

| | | |
|---|---|---|
| 2,658,891 | Mackay | Nov. 10, 1953 |

FOREIGN PATENTS

| | | |
|---|---|---|
| 583,504 | Great Britain | 1946 |